H. S. GREENE.

PLANETARY NAPPING MACHINE DRUM.

APPLICATION FILED JAN. 9, 1914.

Reissued Mar. 10, 1914. 13,695.

2 SHEETS—SHEET 1.

Witnesses.

C. F. Nixson

C. A. Hartnett

Inventor

H. S. Greene.

By Attorneys.

Southgate & Southgate

COLUMBIA PLANOGRAPH CO., WASHINGTON, D. C.

H. S. GREENE.

PLANETARY NAPPING MACHINE DRUM.

APPLICATION FILED JAN. 9, 1914.

Reissued Mar. 10, 1914. 13,695.

2 SHEETS—SHEET 2.

Witnesses.

C. F. Nisson

C. S. Hartnett

Inventor

H. S. Greene.

By Attorneys.

Southgate & Southgate

COLUMBIA PLANOGRAPH CO., WASHINGTON, D. C.

UNITED STATES PATENT OFFICE.

HARRY S. GREENE, OF WOONSOCKET, RHODE ISLAND.

PLANETARY-NAPPING-MACHINE DRUM.

13,695. Specification of Reissued Letters Patent. Reissued Mar. 10, 1914.

Original No. 1,020,280, dated March 12, 1912, Serial No. 654,633. Application for reissue filed January 9, 1914. Serial No. 811,274.

*To all whom it may concern:*

Be it known that I, HARRY S. GREENE, a citizen of the United States, residing at Woonsocket, in the county of Providence and State of Rhode Island, have invented new and useful Improvements in Planetary-Napping-Machine Drums, of which the following is a specification.

My present invention relates to drums of planetary napping machines; and it has for its object to provide simple, durable and efficient means for reducing and practically eliminating friction incidental to the rotation of a circular series of rolls about their axes in a body that carries the said rolls and is itself revoluble about its axis.

The invention is designed more particularly for embodiment in the rotary drum of a planetary napping machine, as herein shown and described, but is not confined to such embodiment, inasmuch as the various claimed combinations may be put to any uses to which they are applicable.

Figure 1:
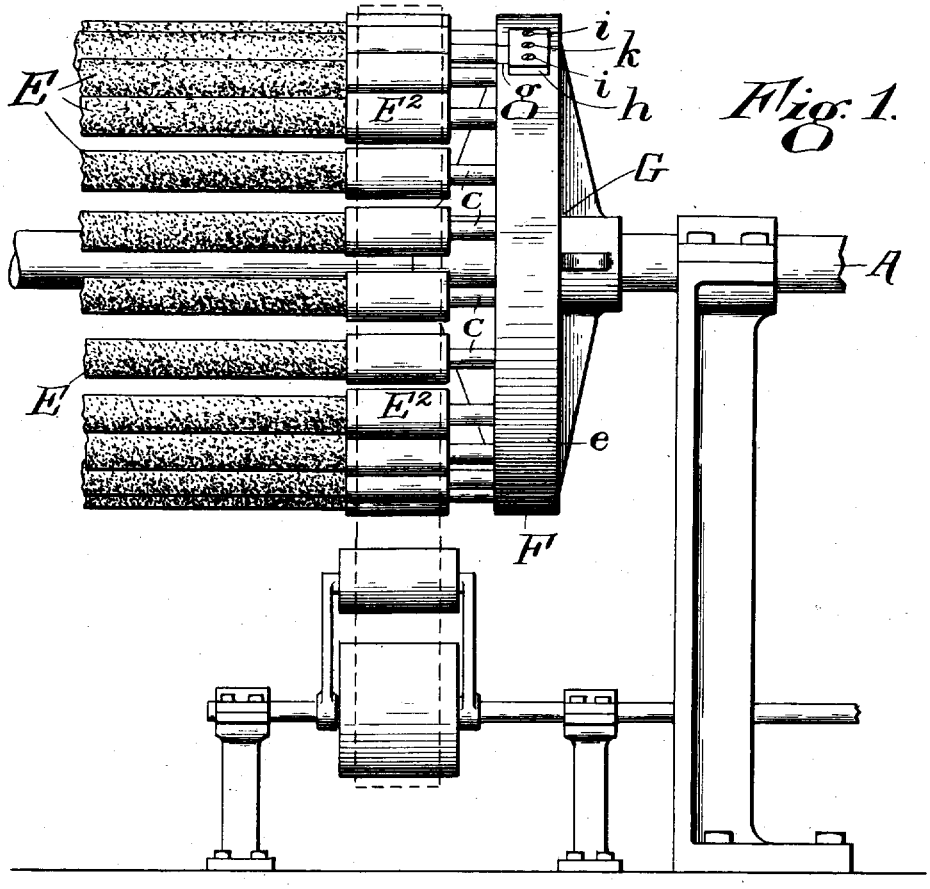
Figure 4:
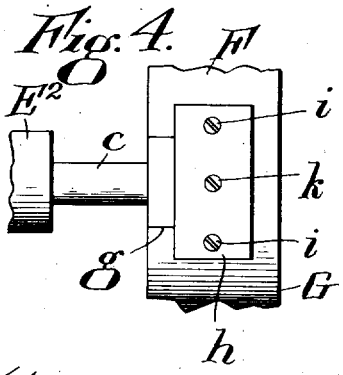
Figure 5:
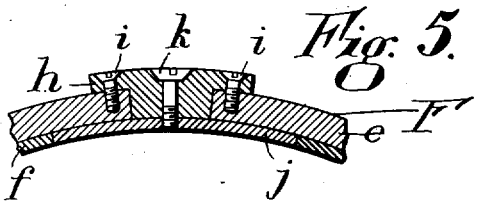
Figure 6:
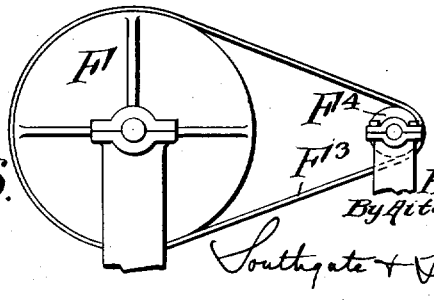
Figure 3:
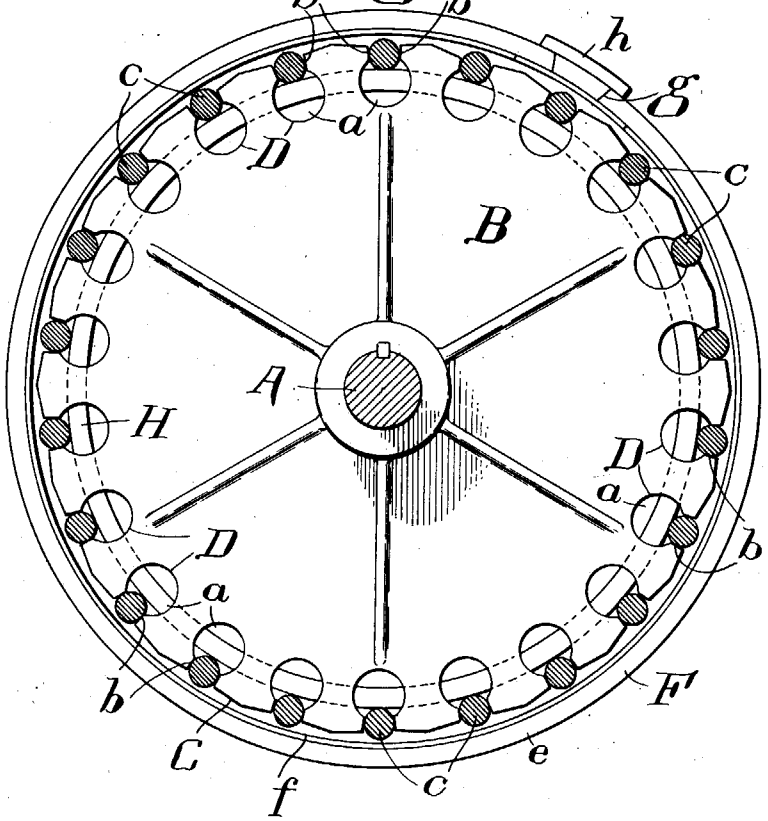
Figure 2:
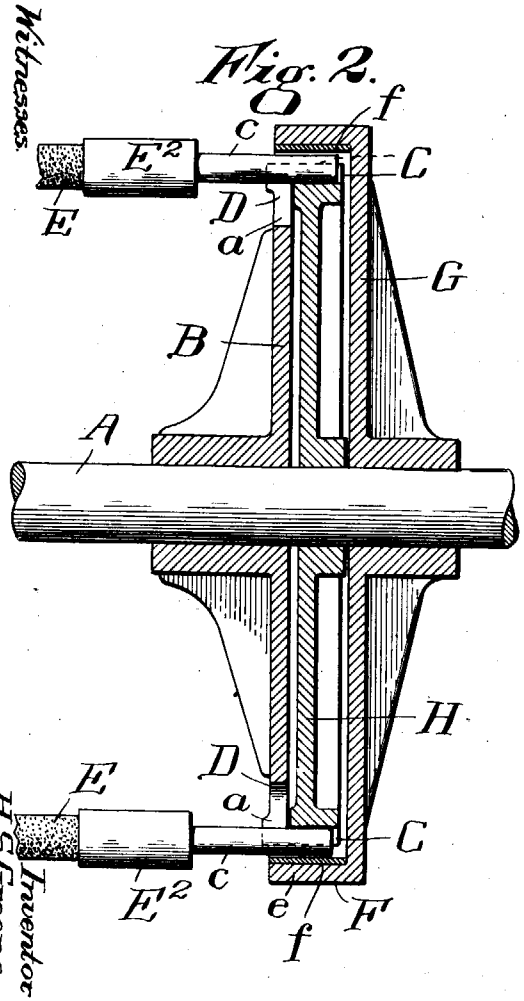

In the accompanying drawings, forming part of this specification, Figure 1 is a side elevation of so much of a planetary napping machine as is necessary to illustrate the best practical embodiment of my invention that I have as yet devised. Fig. 2 is an enlarged diametrical section, with parts in elevation, showing one end portion of the drum constructed in accordance with my invention. Fig. 3 is a view taken at right angle to Fig. 2, and showing the relative arrangement of the journals of the napping rolls, the drum head, the hoop and the inner bearing wheel. Figs. 4 and 5 are detailed views of the closure for the opening in the hoop. Fig. 6 is a view diagrammatic in character of a modification hereinafter definitely referred to.

Referring by letter to said drawings, and more particularly to Figs. 1 to 5 thereof; A is the suitably supported main shaft of the drum of a planetary napping machine, and B is one of the heads of the said drums; the said head being fixed to the shaft so as to turn therewith when the shaft is rotated through the ordinary or any other suitable means. The head B is provided at C with an outwardly-directed circular flange, and in the head and its said flange are formed a plurality of equi-distant transverse openings D, shown as twenty-two in number; each of the said openings preferably, though not necessarily, comprising an inner portion *a* that describes more than half of a circle and an outer comparatively small portion *b* that extends to the perimeter of the head and is there open. The said outer portions *b* of the openings D constitute spaced bearings in the head for the napping or other rolls, hereinafter described, so as to assure the rolls being carried around with the head in spaced relation and circular series when the head is rotated through the medium of and with the main shaft A.

E E are the napping rolls, shown as twenty-two in number, carried by and rotatable about their axes in the drum head B, the journals *c* of the said rolls being disposed and adapted to turn about their axes as well as to move radially of the head in the before mentioned opening portions *b* of the head B, as hereinafter described. The rolls E are equipped with pulleys $E^2$ or with other means for use, in the manner common in the napping machine art, in the rotation of the rolls about their axes during the rotation of the drum about its axis.

F is an annular member or hoop which surrounds the head B and the journals *c* of the napping rolls E. The said hoop is preferably supported and centered in a manner consonant with the purpose of my invention, as by forming it integral with or fixing it to a wheel G that is adapted to turn loosely upon the main shaft A, at the outer side of the head B. In this connection I would say that when desired, the hoop F may be supported and centered on the head B without involving departure from my claimed invention; the last mentioned construction being regarded as equivalent. The hoop F may be of any material and construction suitable to its purpose. In the present embodiment, however, the hoop comprises an outer portion *e* of cast metal, integral with the wheel G, and an inner layer *f*, of steel, with which the journals *c* of the rolls E are designed to contact. Also in the present embodiment, the hoop F is provided with an opening *g*, normally closed by a closure device that is detachably connected to the hoop. The said opening *g* extends to the inner edge of the hoop F and is designed to facilitate the placing of the roll journals in and the removal of said journals from the opening portions *b* of the head B, it being readily apparent that as each opening portion *b* of the head is brought opposite the hoop opening *g*, a roll journal can be very conveniently dropped in or removed from the said opening portion. The referred-to closure device for the opening *g* comprises a block *h* that occupies the opening in the cast metal portion *e* and is detachably connected thereto by screws *i*, and a steel strip *j*, connected by a screw *k* to the block *h* and designed to normally occupy the opening formed in the steel layer *f* so as to render the hard-metal lining of the hoop practically continuous. Because of the connection of the block *h* and the strip *j* through the screw *k* it is necessary to put the closure device in position edgewise and to remove it in similar manner though in reverse direction. While I prefer for the reasons stated to use the opening in the hoop F and a detachable closure device for said opening, I do not desire to be understood as confining myself to the same.

H is a bearing wheel loosely mounted upon the main shaft A and having its periphery machined to a surface to allow for the travel of the roll journals *c* over the same; the said travel of the journals *c* being attended by rotation of the wheel, which derives its motion from the journals *c*, and being also attended by practical elimination of friction, due to the rotation of the wheel by the journals.

It will of course be understood from the foregoing that I have illustrated and described the construction at one end of the drum of a planetary napping machine and that the construction at the opposite end of the drum will be similar. I would also state here that, when desired, pulleys $E^2$ near one end of the drum may be arranged on every other roll E, only, and pulleys $E^2$ near the opposite end of the drum may be arranged on the remaining rolls E, only, this being advantageous since it allows the rolls to be placed closer together and renders it feasible to employ a larger number of rolls in the drum.

The operation of the bearing is as follows: When the rotatable body, specifically the head B, is rotated about its axis, the journals *c* of the rolls E will at first bear against the periphery of the wheel H, and by causing the said wheel to turn about its axis, will practically eliminate friction during the initial turning of the rolls E about their axes. When the rotating body or head B has attained a certain speed, the journals *c* of the rolls C will, by reason of centrifugal action, be caused to leave the periphery of the wheel H and to bear against the inner surface of the hoop F and cause the same to travel, and this in reverse direction to the body or head B provided the rolls F are rotated about their axes in a direction reversely to the direction of rotation of the body or head B. In other words, the hoop F will be caused to turn about the series of rolls and the body or head B by the journals of the rolls, and the bearing surfaces of the journals and hoop operating or moving complementary to each other, practically eliminate friction incidental to the rotation of the journals about their axes. When the rotating body or head B slows up in approaching a standstill, and at other times when the centrifugal force is insufficient to maintain the roll journals in contact with the inner surface of the hoop F, the said journals at the top will contact with and turn the wheel H, and at the bottom will rest upon the hoop F, and from this it follows that at all times during the rotation of the body or head B about its axis, and the rotation of the rolls F about their axes, friction will be reduced to a minimum. This is materially advantageous because it materially prolongs the usefulness of all of the working parts, and also because but comparatively little power is required to start and also to rotate the body or head B about its axis and the rolls F about their axes. When it is deemed expedient to impart extraneous motion to the hoop F rather than depend on the contact between the roll journals and hoop to turn the latter about the circular series of journals, the hoop can be so moved by any suitable driving connection from any working part of the machine, as through the medium of the band $F^3$ in Fig. 6, which band is passed around the hoop F and a driven pulley $F^4$ of the napping or other machine, and is designed to turn or move the hoop at a rate of speed commensurate with that at which the napping roll journals are rotated.

It will be readily gathered from the foregoing that the element of gravity regulates the bearing of the rolls upon the wheel H and the hoop F until the centrifugal force overcomes said element; also, that it is to overcome, primarily, the force of gravity that the wheel H is embodied in the construction.

While I have shown the drum as equipped with twenty-two napping rolls it is to be understood that the number of rolls may be varied as desired; and I would also have it understood that if there was a preference as to the number of rolls, it would be the employment of thirty-six rolls in lieu of twenty-two rolls.

Having described my invention, what I claim and desire to secure by Letters-Patent is:

1. The combination of a suitably supported shaft, a head fixed on and adapted to turn with the shaft and having a lateral circular flange at its perimeter and also having in its major portion flange openings that extend radially outward to its perimeter, a plurality of rolls having journals carried by said head in the said openings thereof and adapted to be rotated about their axes when the head is rotated about its axis, a wheel loosely mounted on the shaft, alongside the head, a hoop carried by said wheel and surrounding and movable about the circular series of roll journals and against which said journals are caused to bear by the centrifugal action created by rotation of the head, and a wheel loosely mounted on the shaft, at a point intermediate the head and the first named wheel, and arranged between the flange of the head and the shaft and also arranged within the circular series of roll journals and against which the said journals bear when they are out of contact with the said hoop.

2. The combination of a suitably supported shaft, a head fixed on and adapted to turn with the shaft; said head having spaced bearings in the perimeter thereof, a plurality of rolls having journals carried by said head in said bearings and adapted to be rotated about their axes when the head is rotated about its axis, a wheel loosely mounted on the shaft, a hoop carried by said wheel and surrounding and movable about the circular series of roll journals and against which said journals are caused to bear by the centrifugal action created by rotation of the head, and a wheel loosely mounted on the shaft and arranged within the circular series of roll journals and against which the said journals bear when they are out of contact with the said hoop.

3. The combination of a rotatable body, a circular series of rolls carried by said body and adapted to be rotated about their axes incidental to rotation of the body about its axis, a suitably supported and centered hoop surrounding and movable about the circular series of rolls and against which the rolls are caused to bear by the centrifugal action created by rotation of the body, and suitably supported and centered circular bearing means adapted to turn independently of the body and the hoop and arranged within the circular series of rolls and opposed to said rolls so as to be turned by the rolls when the latter are out of contact with the hoop.

4. The combination of a rotatable body, a circular series of rolls carried by said body and adapted to be rotated about their axes when the body is rotated about its axis, a hoop surrounding and movable about the circular series of rolls and against which said rolls are caused to bear by the centrifugal action created by rotation of the body, and bearing means separate from the body and capable of turning independently of the body and the hoop and arranged within the circular series of rolls and opposed to said rolls so as to be turned by the rolls when the latter are out of contact with the hoop.

5. The combination of a rotatable body having spaced bearings therein, a circular series of rolls carried by said body in the said bearings thereof and adapted to be rotated about their axes when the body is rotated about its axis, a hoop surrounding and movable about the circular series of rolls and against which said rolls are caused to bear by the centrifugal action created by rotation of the body, and circular bearing means separate from the body and capable of turning independently of the body and the hoop and arranged within the circular series of rolls and opposed to said rolls so as to be turned by the rolls when the latter are out of contact with the hoop.

6. The combination of a rotatable body, a circular series of rolls carried by said body and adapted to be rotated about their axes when the body is rotated about its axis, movable friction-reducing means against which said rolls are caused to bear by the centrifugal action created by rotation of the body, and circular bearing means separate from the body and capable of turning independently of the body and arranged within the circular series of rolls and opposed to said rolls so as to be turned by the rolls when the latter are out of contact with the said friction-reducing means.

7. The combination of a rotatable body, a circular series of rolls carried by said body and adapted to be rotated about their axes when the body is rotated about its axis, a hoop surrounding and movable about the circular series of rolls and against which said rolls are caused to bear by the centrifugal action created by rotation of the body, bearing means adapted to turn independently of the body and the hoop and arranged within the circular series of rolls and opposed to said rolls so as to be turned by the rolls when the latter are out of contact with the hoop, and means acting directly on the hoop and adapted to move the same at a rate of speed commensurate with that at which the rolls are rotated.

8. A planetary napping machine having a rotatable head, a circular series of napping rolls circumferentially confined but radially movable in said head, and an annular member mounted to rotate substantially concentrically with said head and forming the bearing surfaces for confining the rolls radially in working position in said head.

9. A planetary napping machine having two rotatable heads, a circular series of napping rolls circumferentially confined but radially movable in said heads, and two annular members mounted to rotate concentrically with said heads and forming the bearing surfaces for confining the rolls radially in working position in said heads.

10. A planetary napping machine, having in combination rotatable heads with spaced bearings therein, a circular series of napping rolls independently rotatable in said bearings, and annular members mounted to rotate freely relatively to said heads, said members constituting the outer side of each of said bearings for confining the rolls radially in said heads.

11. A planetary napping machine, having in combination rotatable heads with spaced open-sided bearings therein, a circular series of napping rolls rotatable in said bearings, annular members freely rotatable in the planes of the heads and constituting the outer side of each bearing, and means separate from the rolls for supporting said annular members substantially concentrically with said heads.

12. The combination of a head of a rotatable drum; said head having spaced bearings therein, a circular series of rolls carried by said head in the said bearings thereof and adapted to be rotated about their axes when the head is rotated about its axis, a hoop surrounding and movable about the circular series of rolls and against which said rolls are caused to bear by the centrifugal action created by rotation of the head, and means acting directly on the hoop and adapted to move the same at a rate of speed commensurate with that at which the rolls are rotated.

13. The combination of a rotatable body, a circular series of exposed rolls carried in spaced relation by said body and provided with means for acting on cloth and adapted to be rotated about their axes incidental to rotation of the body about its axis, means for rotating the rolls about their axes, and a bearing wheel having the same center of movement as the rotatable body and also having its periphery arranged within the circular series of rolls and opposed to said rolls so as to be moved thereby independently of the rotatable body.

14. The combination of a rotatable body, a circular series of exposed rolls carried in spaced relation by said body and provided with means for acting on cloth and adapted to be rotated about their axes incidental to rotation of the body about its axis, means for rotating the rolls about their axes, and suitably supported and centered circular bearing means separate from the body and capable of turning independently of the body and arranged within the circular series of rolls and opposed to said rolls so as to be moved or turned thereby.

15. A planetary napping machine, having in combination rotatable heads with spaced bearings therein, a circular series of napping rolls rotatable upon their axles in said bearings, and annular members, said bearings having substantially radial sides and being open to their full width at their outer sides, and said members being freely rotatable in the planes of the heads, covering said bearings, constituting the outer side of each of said bearings, and having rolling contact with said axles.

16. A planetary napping machine, having in combination a rotating shaft, a circular series of napping rolls, and bearings supported on said shaft for holding said rolls in spaced relation to said shaft and to each other, each of said rolls having line contact at a plurality of points with surfaces fixed relatively to said shaft and having rolling contact with an additional surface movable relatively to said shaft and forming the outer side of said bearings.

In testimony whereof I have signed my name to this specification, in the presence of two subscribing witnesses.

HARRY S. GREENE.

Witnesses:

CHAS. T. HAWLEY,

C. FORREST WESSON.

Copies of this patent may be obtained for five cents each, by addressing the "Commissioner of Patents, Washington, D. C."